US010288311B2

(12) United States Patent
Cho et al.

(10) Patent No.: US 10,288,311 B2
(45) Date of Patent: May 14, 2019

(54) COOKING APPLIANCE

(71) Applicant: Samsung Electronics Co., Ltd., Suwon-si (KR)

(72) Inventors: Sung Min Cho, Seoul (KR); Jae Sung Kwon, Seoul (KR); Se Bin Im, Suwon-si (KR); Seong Deog Jang, Suwon-si (KR); Jin-Hee Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 790 days.

(21) Appl. No.: 14/842,658

(22) Filed: Sep. 1, 2015

(65) Prior Publication Data

US 2016/0061490 A1 Mar. 3, 2016

(30) Foreign Application Priority Data

Sep. 2, 2014 (KR) .................. 10-2014-0116053

(51) Int. Cl.
*F24H 1/10* (2006.01)
*F24H 1/12* (2006.01)
(Continued)

(52) U.S. Cl.
CPC .............. *F24H 1/106* (2013.01); *A21B 1/24* (2013.01); *F24C 15/325* (2013.01);
(Continued)

(58) Field of Classification Search
None
See application file for complete search history.

(56) References Cited

U.S. PATENT DOCUMENTS 3,126,469 A * 3/1964 Feldmann et al. .... F24H 9/0047
  219/543
3,766,357 A * 10/1973 Koester, Jr. ............. F24H 1/142
  138/149
(Continued)

FOREIGN PATENT DOCUMENTS

EP  1010384 A1 *  6/2000 ............ F24C 15/327
EP  1757861 A1    2/2007
(Continued)

OTHER PUBLICATIONS

Communication pursuant to Article 94(3) EPC dated May 29, 2017 corresponding to European Application No. 1518363.9.
(Continued)

*Primary Examiner* — Joseph M Pelham
(74) *Attorney, Agent, or Firm* — Staas & Halsey LLP

(57) ABSTRACT

Provided is a cooking appliance having an improved structure in which superheated steam is capable of being used during a cooking operation. The cooking appliance supplies superheated steam while food is cooked, and includes: a main body, a front of which is opened and in which a cooking compartment is disposed; a heating chamber disposed in the main body to be in communication with the cooking compartment; a steam generator disposed to generate steam sprayed into the heating chamber; and a convection heater disposed in the heating chamber to heat the heating chamber and the cooking compartment. The convection heater heats steam discharged from the steam generator, and the steam discharged from the steam generator, in a superheated steam state, is sprayed into the heating chamber and supplied into the cooking compartment.

26 Claims, 12 Drawing Sheets

(51) Int. Cl.
*F24C 15/32* (2006.01)
*A21B 1/24* (2006.01)
*H05B 6/64* (2006.01)
*A21B 3/04* (2006.01)

(52) U.S. Cl.
CPC ............ *F24C 15/327* (2013.01); *F24H 1/122* (2013.01); *H05B 6/6485* (2013.01); *A21B 3/04* (2013.01)

(56) References Cited

U.S. PATENT DOCUMENTS

| | | | | |
|---|---|---|---|---|
| 4,771,163 | A * | 9/1988 | Thiboutot | A21B 1/26 126/21 A |
| 5,768,982 | A * | 6/1998 | Violi | F24C 15/327 126/20 |
| 8,369,695 | B2 * | 2/2013 | Lee | F24C 15/327 392/386 |
| 9,788,678 | B2 * | 10/2017 | Abe | F24C 15/327 |
| 2006/0011607 | A1 * | 1/2006 | Cho | F24C 15/327 219/401 |
| 2006/0191892 | A1 * | 8/2006 | Andoh | A21B 3/04 219/401 |
| 2008/0078755 | A1 * | 4/2008 | Jeon | A47J 27/04 219/401 |
| 2010/0224616 | A1 * | 9/2010 | Yasuhara | F24C 15/327 219/401 |
| 2010/0230396 | A1 * | 9/2010 | Boubeddi | F22B 1/284 219/399 |
| 2012/0273477 | A1 * | 11/2012 | Park | F24C 15/327 219/441 |
| 2014/0199455 | A1 | 7/2014 | Bilet et al. | |

FOREIGN PATENT DOCUMENTS

| | | |
|---|---|---|
| EP | 2031116 A1 | 3/2009 |
| EP | 2312220 A1 | 4/2011 |
| EP | 2369227 A2 | 9/2011 |
| FR | 2 934 360 A1 | 1/2010 |
| JP | 2003307310 A | 10/2003 |
| WO | 2013080100 A1 | 6/2013 |

OTHER PUBLICATIONS

Communication with European Search Report dated Jan. 15, 2016 corresponding to European Application No. 1518363.9.
European Patent Office Action issued Communication under Rule 71(3) EPC in European Patent Application No. 15 183 363.9 dated Sep. 11, 2018 (43 pages).

* cited by examiner

COOKING APPLIANCE

CROSS-REFERENCE TO RELATED APPLICATIONS

This application claims the benefit of Korean Patent Application No. 10-2014-0116053, filed on Sep. 2, 2014 in the Korean Intellectual Property Office, the disclosure of which is incorporated herein by reference.

BACKGROUND

Embodiments of the present invention relate to a cooking appliance, and more particularly, to a cooking appliance having an improved structure in which superheated steam is capable of being used during a cooking operation.

Ovens are apparatuses that perform a cooking operation by sealing and heating a cooking material. In general, ovens can be classified into electric ovens, gas ovens, and microwave ovens according to the type of heat source. Electric ovens use an electric heater as a heat source, gas ovens use heat generated by a gas, and microwave ovens use the frictional heat of water molecules generated by a high frequency as a heat source.

An oven includes a cooking compartment in which food is cooked and an electronic device compartment in which electronic device components are accommodated. The inside of the cooking compartment is sealed in such a way that high-temperature heat is not dissipated outside of the oven while the food is being cooked.

Cooking appliances in which steam is supplied into a cooking compartment while food is cooked, so that a cooking task can be indirectly performed by the steam heat to improve the texture of food and reduce the loss of nutrients from the food, have been recently developed.

When the cooking task is performed using a cooling appliance having a steam generator, a loss of nutrients, such as vitamin C, which is easily destroyed by heating, can be reduced. In addition, when cooking salted food, such as salted fish, steam is added to reduce the salt concentration making the outside of the salt food crispy while the making the inside of the salted food moist. In addition, steam is added while baking bread so that a surface of the bread can be prevented from being hardened. As a result, sufficient oven spring, a phenomenon in which the volume of bread dough is increased when the dough of fermented bread is baked, can be performed and the flavor of bread can be improved.

The above-described cooking effects can be further maximized when superheated steam is used.

SUMMARY

Therefore, it is an aspect of the present invention to provide a cooking appliance having an improved structure in which superheated steam is capable of being supplied into a cooking compartment.

It is another aspect of the present invention to provide a cooking appliance having an improved structure in which steam generated by a steam generator is capable of being changed into superheated steam.

Additional aspects of the invention will be set forth in part in the description which follows and, in part, will be obvious from the description, or may be learned by practice of the invention.

In accordance with one aspect of the present invention, a cooking appliance supplies superheated steam while food is cooked, and includes: a main body, a front of which is opened and in which a cooking compartment is disposed; a heating chamber disposed in the main body to be in communication with the cooking compartment; a steam generator disposed to generate steam sprayed into the heating chamber; and a convection heater disposed in the heating chamber to heat the heating chamber and the cooking compartment, wherein the convection heater may discharge heat steam from the steam generator, and the steam discharged from the steam generator in a superheated steam state may be sprayed into the heating chamber and may be supplied into the cooking compartment.

The cooking appliance may further include a steam supplying pipe that connects the steam generator and the heating chamber so that the steam discharged from the steam generator is supplied to the heating chamber, wherein the steam discharged from the steam generator may be heated while the steam is moved along the steam supplying pipe and may be changed into superheated steam.

The steam generator and the convection heater may be disposed to face each other in a state in which one wall of the main body is disposed between the steam generator and the convection heater, and the steam supplying pipe may pass through one wall of the main body and may connect the steam generator and the heating chamber.

The convection heater may be fixed to one inner wall of the main body that forms the heating chamber, and the steam supplying pipe may include a first section, which is adjacent to the convection heater and at least a part of which is fixed to one inner wall of the main body.

The first section may be disposed along a circumference of the convection heater.

A steam discharge port, through which superheated steam is discharged, may be disposed in the first section, and the steam discharge port may be separated from one inner wall of the main body.

The cooking appliance may further include a convection fan that is rotatably disposed in the heating chamber so that at least one of heat generated in the convection heater and superheated steam discharged through the steam discharge port may be circulated in the cooking compartment, wherein the steam discharge port may be disposed in front of the convection fan.

The steam discharge port may be opened toward an upper portion of the heating chamber so that superheated steam may be discharged toward the upper portion of the heating chamber.

The first section may include: a fixed portion fixed to one inner wall of the main body; and a separation portion separated from one inner wall of the main body, wherein a steam discharge port through which superheated steam is sprayed into the heating chamber may be disposed in the separation portion.

The first section may further include a bending portion that connects the fixed portion and the separation portion, and the steam discharge port may be disposed in an upper position of the heating chamber than the bending portion.

The steam supplying pipe may further include a second section that is disposed to face one outer wall of the main body and connects the steam generator and the first section.

The steam supplying pipe may include: a second section that is connected to the steam generator and is disposed to face one outer wall of the main body; and a connection section that passes through one wall of the main body to connect the fixed portion and the second section.

The connection section may be disposed above the steam discharge port.

The cooking compartment and the heating chamber may be partitioned by a partitioning panel having a plurality of openings, and at least one of heat generated in the convection heater and superheated steam heated by the convection heater may be circulated in the heating chamber and the cooking compartment through the plurality of openings.

In accordance with another aspect of the present invention, a cooking appliance supplies superheated steam while food is cooked, and includes: a main body in which a cooking compartment is disposed; a steam generator disposed to generate steam by primarily heating supplied water; a steam supplying flow path that connects the steam generator and the cooking compartment so that steam generated by the steam generator is moved to the cooking compartment; and a heater disposed on the steam supplying flow path to form superheated steam by secondarily heating steam generated by the steam generator.

The heater may be disposed in an inner wall of the main body to face the cooking compartment.

The heater may include a convection heater.

The cooking appliance may further include a water supplying device disposed to supply water to the steam generator, wherein the water supplying device may include: a storing unit disposed to be unloaded from the main body outward so that water is stored in the storing unit; and at least one pump disposed between the storing unit and the steam generator so as to supply a driving force at which water moves between the storing unit and the steam generator.

The cooking appliance may further include a water channel that connects the water supplying device and the steam generator, wherein the water channel may include: a water supplying flow path on which water supplied to the storing unit moves toward the steam generator; and a drainage flow path on which water that remains in the steam generator moves toward the storing unit.

The at least one pump may include: a water supplying pump disposed on the water supplying flow path; and a drainage pump disposed on the drainage flow path.

The water supplying flow path and the drainage flow path may cross each other and may form at least one crossing point.

A part of the steam supplying flow path may be disposed along an outer circumference of the heater.

In accordance with another aspect of the present invention, a cooking appliance supplies superheated steam while food is cooked, and includes: a main body, a front of which is opened and in which a cooking compartment is disposed; a steam generator disposed to generate steam sprayed into the cooking compartment; a convection heater disposed in the main body to heat steam discharged from the steam generator; and a steam supplying pipe that is connected to the steam generator so that air discharged from the steam generator is moved, and that extends to an inside of the cooking compartment, wherein steam discharged from the steam generator may be heated by the convection heater while passing through the steam supplying pipe, and the steam in a superheated steam state may be sprayed into the cooking compartment.

The convection heater may be installed on an inner wall of the main body, and the steam supplying pipe may be installed on the inner wall of the main body along a circumference of the convection heater to be adjacent to the convection heater.

A steam discharge port, through which superheated steam is discharged, may be disposed in the steam supplying pipe, and the steam discharge port may be separated from the inner wall of the main body.

The cooking appliance may further include a convection fan that is rotatably installed on the inner wall of the main body so that at least one of the heat generated in the convection heater and superheated steam discharged through the steam discharge port may be circulated in the cooking compartment, wherein the steam discharge port may be disposed in the steam supplying pipe to be oriented toward the convection fan.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Hereinafter, exemplary embodiments of the present invention will be described in detail with reference to the accompanying drawings. Meanwhile, terms "front end", "rear end", "upper portion", "lower portion", "top end", and "bottom end" used in the following description are defined based on the drawings. A shape and a position of each of elements are not limited by the terms.

Figure 1:
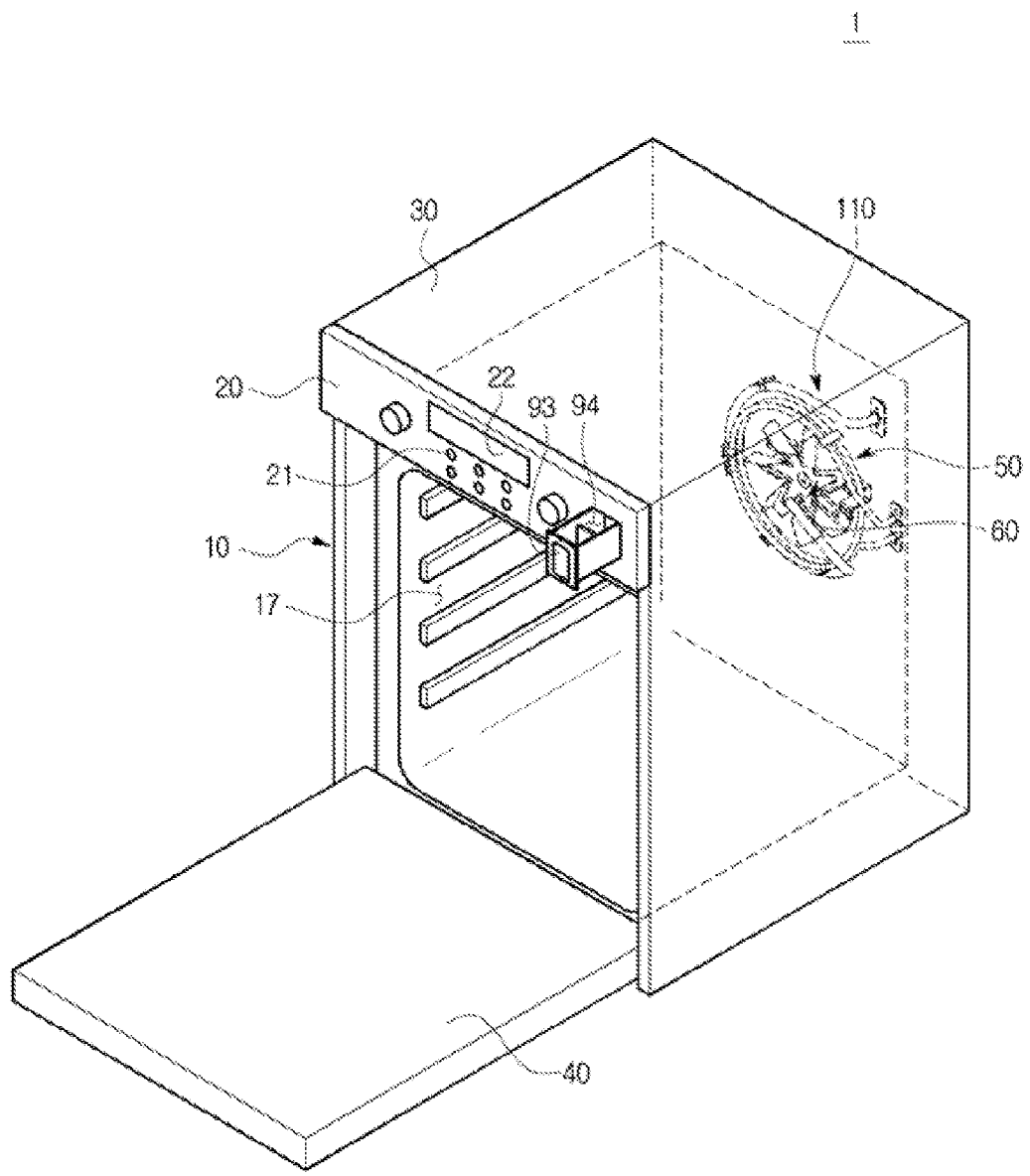
FIG. 1 is a perspective view of a cooking appliance according to an embodiment of the present invention.
Figure 2:
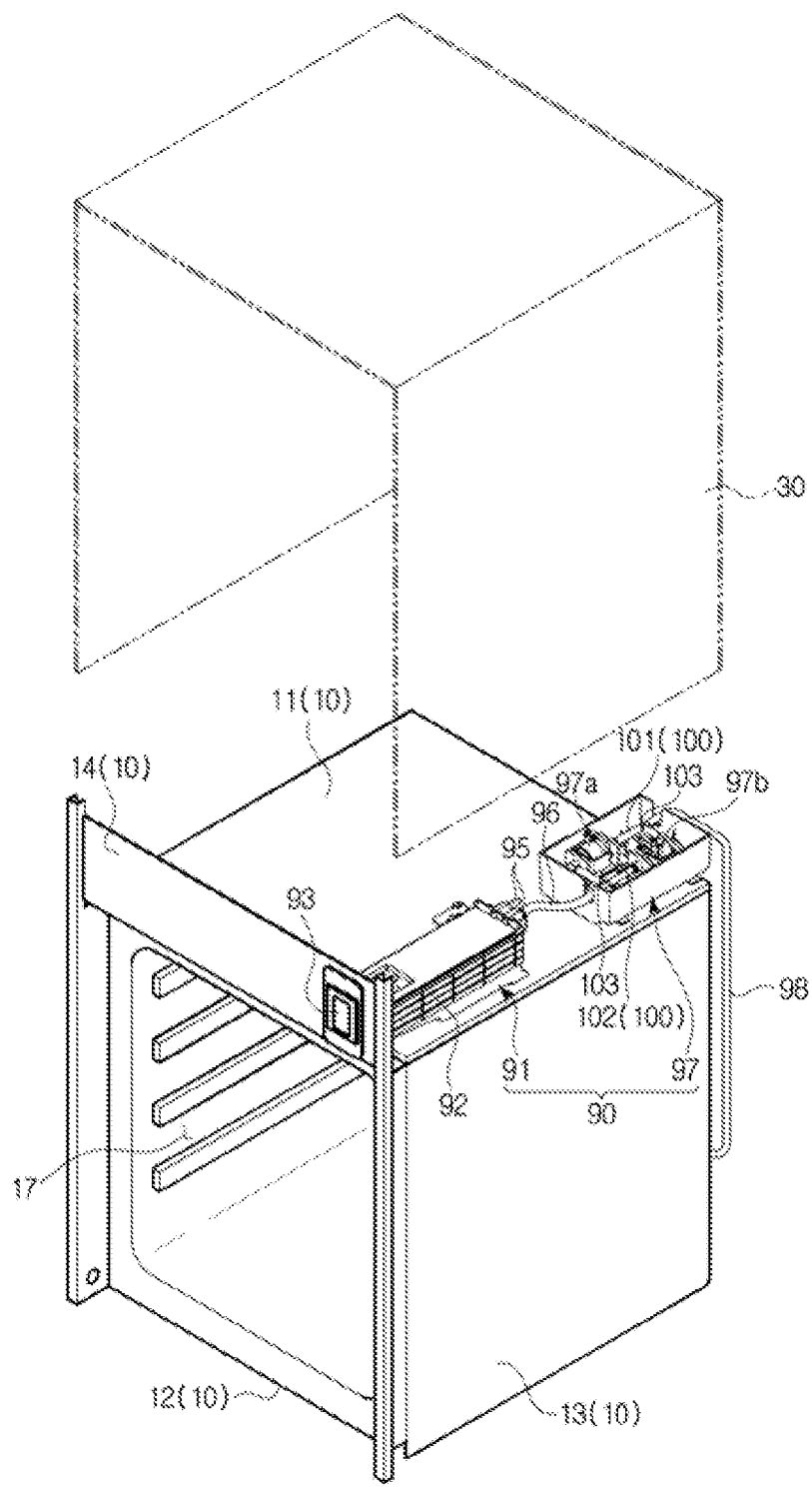
FIG. 2 is a perspective view illustrating a state in which a cover of the cooking appliance according to an embodiment of the present invention is separated, in accordance with one aspect.
Figure 3:
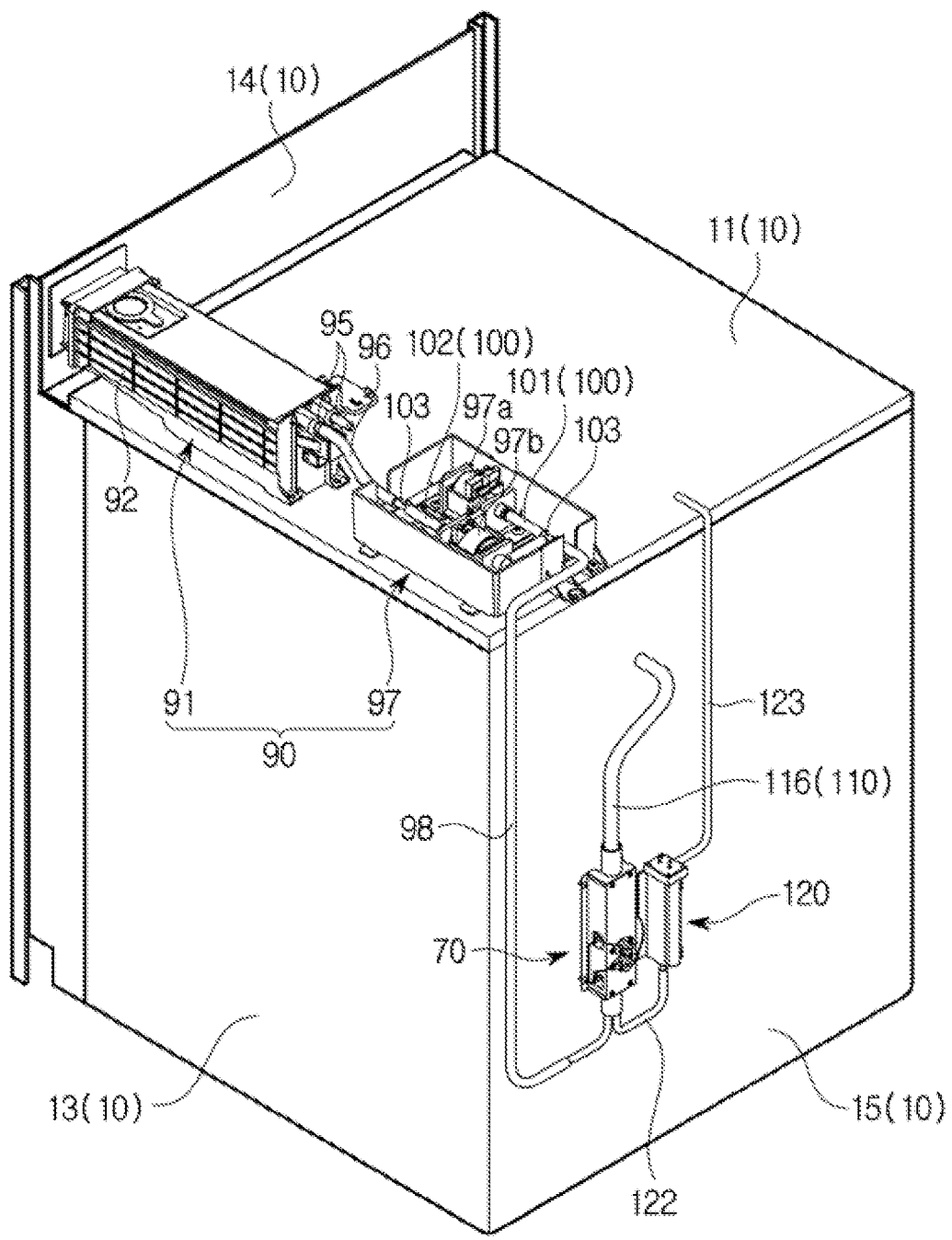
FIG. 3 is a perspective view illustrating a state in which the cover of the cooking appliance according to an embodiment of the present invention is separated, in accordance with another aspect.

FIG. 1 is a perspective view of a cooking appliance according to an embodiment of the present invention, and FIG. 2 is a perspective view illustrating a state in which a cover of the cooking appliance according to an embodiment of the present invention is separated, in accordance with one aspect. FIG. 3 is a perspective view illustrating a state in which the cover of the cooking appliance according to an embodiment of the present invention is separated, in accordance with another aspect. A heater disposed to heat a cooking compartment 17 includes various types of heaters. For example, the heater may include a convection heater 50. Hereinafter, the convection heater 50 will be described. However, as described above, the type of the heater is not limited to the convection heater 50.

As illustrated in FIGS. 1 through 3, a cooking appliance 1 may include a main body 10, a cover 30, a door 40, a convection heater 50, a convection fan 60, and a steam generator 70.

The main body 10 may be coupled to the cover 30 and may form an exterior of the cooking appliance 1.

The cooking compartment 17 may be disposed in the main body 10.

An inside of the cooking compartment 17 may be coated to prevent an inner wall of the cooking compartment 17 from being corroded by condensation water, which may be generated in a condensation operation of at least one of steam and superheated steam, or by water included in the food itself. The inside of the cooking compartment 17 may be dried by heat generated while food is cooked.

The main body 10 may have an opened surface so that food may be put into/taken out of the main body 10 through the opened surface. In other words, the cooking compartment 17 disposed in the main body 10 may have an opened surface so that food may be put into/taken out of the main body 10 through the opened surface.

The main body 10 may include a plurality of frames. The plurality of frames may include a top frame 11, a bottom frame 12, a right side frame 13, a left side frame (not shown), a front frame 14, and a rear frame 15. A part of the front frame 14 may be opened so that food may be put into/taken out of the opened part of the front frame 14. The plurality of frames may be coupled to each other and may form the main body 10.

The cover 30 may be disposed to cover the main body 10. In detail, the cover 30 may be disposed to cover the top frame 11, the right side frame 13, the left side frame (not shown), and the rear frame 15 of the main body 10. As described above, the cover 30 may be coupled to the main body 10 and may form an exterior of the cooking appliance 1.

The cooking compartment 17 in which food is cooked, may be opened/closed by the door 40 coupled to the front of the main body 10. The door 40 may be rotatably coupled to or disposed at the front of the main body 10. In other words, the door 40 may be rotatably coupled to the front frame 14 of the main body 10. The door 40 may be coupled to open/close the opened part of the front frame 14.

A control panel 20 on which various operation switches 21 are disposed, may be disposed on a front surface of the main body 10 so that a user may control an operation of the cooking appliance 1 through the control panel 20. In addition, a display unit 22 that displays an operating state of the cooking appliance 1 may be disposed on the control panel 20. The display unit 22 may also serve as a touch screen that is an input device through which predetermined instructions are executed when the user touches the body or a particular device on a particular portion of a screen. Thus, the user may operate at least one of the operation switches 21 and the display unit 22, thereby controlling the operation of the cooking appliance 1.

The control panel 20 may be coupled to the front frame 14 of the main body 10.

Alternatively, the control panel 20 may be formed integrally with the front frame 14 of the main body 10.

The convection heater 50 may be disposed on at least one wall of the main body 10 so as to heat the cooking compartment 17, i.e., to heat food in the cooking compartment 17. The convection heater 50 may be disposed on at least one inner wall of the main body 10 to face the cooking compartment 17. The convection heater 50 may be installed at or fixed to at least one inner wall of the main body 10. Preferably, the convection heater 50 may be installed at or fixed to the rear frame 15 of the main body 10. A heater used to heat the cooking compartment 17 is not limited to the convection heater 50.

The convection heater 50 may be used to heat the cooking compartment 17 and to heat steam generated in the steam generator 70 so that superheated steam may be supplied to the cooking compartment 17. In this way, since the convection heater 50 may be used when superheated steam is generated, the inconvenience of installing a separate heater may be avoided. A procedure of generating superheated steam using the convection heater 50 will be described later.

A convection fan 60 may be disposed in the main body 10 so that heat generated in the convection heater 50 may be circulated in the cooking compartment 17 through the convection fan 60. The convection fan 60 may be rotatably disposed on an inner wall of the main body 10. The convection fan 60 may be disposed in the main body 10 so that heat generated by the convection heater 50 and superheated steam heated by the convection heater 50 may be circulated in the cooking compartment 17 through the convection fan 60. In other words, the convection fan 60 may be rotatably disposed on the inner wall of the main body 10 that at least one of heat generated by the convection heater 50 and superheated steam discharged through a steam discharge port 111 (see FIG. 4) may be circulated in the cooking compartment 17. The convection fan 60 may be disposed on at least one inner wall of the main body 10 to face the cooking compartment 17. The convection fan 60 may be installed at or fixed to at least one inner wall of the main body 10. Preferably, the convection fan 60 may be installed at or fixed to the rear frame 15 of the main body 10.

The number of convection heaters 50 and convection fans 60 and positions of arrangement thereof may be modified in various ways.

The steam generator 70 may be disposed to generate steam and to supply the generated steam into the cooking compartment 17. The steam generator 70 may be disposed to generate steam by heating water supplied by a water supplying device 90. The steam generator 70 may be disposed outside the main body 10. In detail, the steam generator 70 may be disposed at an outer edge of the rear frame 15 of the main body 10. In other words, the steam generator 70 may be disposed between the rear frame 15 of the main body 10 and the cover 30. The steam generator 70 and at least one of the convection heaters 50 and the convection fans 60 may be disposed to face each other in a state in which one wall of the main body 10 is disposed between the steam generator 70 and at least one of the convection heaters 50 and the convection fans 60. That is, the steam generator 70 and at least one of the convection heaters 50 and the convection fans 60 may be disposed to face each other in a state in which the rear frame 15 of the main body 10 is disposed between the steam generator 70 and at least one of the convection heaters 50 and the convection fan 60s. However, the arrangement position of the steam generator 70 may be changed in various ways. A detailed description of the steam generator 70 will be provided later.

The water supplying device 90 may be disposed to supply water to the steam generator 70. The water supplying device 90 may be disposed in the main body 10. The water supplying device 90 may be disposed between the main body 10 and the cover 30. In detail, the water supplying device 90 may be disposed between the top frame 11 of the main body 10 and the cover 30. The water supplying device 90 may be fixed to the main body 10. That is, the water supplying device 90 may be fixed to the top frame 11 of the main body 10.

The water supplying device 90 may include a storing unit 91 and at least one pump 97.

The storing unit 91 may be disposed such that it may be unloaded from the main body 10 outward. In detail, the storing unit 91 may be disposed such that it may be unloaded from the front surface of the main body 10 forward. That is, the storing unit 91 may be disposed such that it may be unloaded from the front frame 14 or the control panel 20 of the main body 10 forward. The storing unit 91 may be disposed in front of the at least one pump 97. The user may unload the storing unit 91 to supply water to the steam generator 70 or to remove water that remains in the steam generator 70.

The storing unit 91 may include a holder 92 and a slider 9, coupled to an inside of the holder 92 in order to slide.

The holder 92 may be coupled to the main body 10. In detail, the holder 92 may be coupled to or fixed to at least one of the front frame 14 and the top frame 11 of the main body 10. A slider accommodation portion (not shown) may be disposed in the holder 92 so as to accommodate the slider 93. A rail portion (not shown) may be disposed inside the slider accommodation portion (not shown) so that the slider 93 may slide through the rail portion.

The slider 93 may include an accommodation portion 94 that accommodates water supplied from the outside and a connection portion 95 that protrudes from a rear side of the accommodation portion 94 outward by a predetermined length. A connection pipe 96 may be connected to the connection portion 95. The connection pipe 96 connects the storing unit 91 and the at least one pump 97. Since the connection pipe 96 may be frequently moved together with the slider 93, and the slider 93 is unloaded from the main body 10 forward or is inserted into an inside of the main body 10, the connection pipe 96 may be formed of a material, which is easily bendable and whose shape is not easily deformed by repetitive movement. In one example, the connection pipe 96 may include materials, such as synthetic resin and rubber.

The storing unit 91 may further include a detection portion (not shown) that is coupled to one side of the holder 92 and detects movement of the slider 93.

The at least one pump 97 may be disposed between the storing unit 91 and the steam generator 70 so as to provide a driving force at which water moves between the storing unit 91 and the steam generator 70. The at least one pump 97 may be disposed behind the storing unit 91. The at least one pump 97 may be coupled to the main body 10. In detail, the at least one pump 97 may be coupled to or fixed to the top frame 11 of the main body 10.

The at least one pump 97 may include a water supplying pump 97a and a drainage pump 97b. The water supplying pump 97a supplies water stored in the accommodation portion 94 to the steam generator 70. The drainage pump 97b supplies the water that remains in the steam generator 70 to the accommodation portion 94. The water supplying pump 97a and the drainage pump 97b may participate in both the movement of water between the accommodation portion 94 and the steam generator 70 and the movement between the accommodation portion 94 and an auxiliary steam generator 120. That is, the water supplying pump 97a supplies water stored in the accommodation portion 94 to the steam generator 70 and the auxiliary steam generator 120. The drainage pump 97b supplies water that remains in the steam generator 70 and the auxiliary steam generator 120 to the accommodation portion 94.

The water supplying device 90 and the steam generator 70 may be connected to each other using a water supplying pipe 98. In detail, the at least one pump 97 and the steam generator 70 may be connected to each other using the water supplying pipe 98.

The connection pipe 96 connected to the storing unit 91 may branch and may be connected to the at least one pump 97. That is, the connection pipe 96 connected to the storing unit 91 may branch and may be connected to the water supplying pump 97a and the drainage pump 97b, respectively. The water supplying pipe 98 connected to the steam generator 70 may branch and may be connected to the at least one pump 97. That is, the water supplying pipe 98 connected to the steam generator 70 may branch and may be connected to the water supplying pump 97a and the drainage pump 97b, respectively.

The cooking appliance 1 may further include the auxiliary steam generator 120.

The auxiliary steam generator 120 may be disposed adjacent to the steam generator 70. A water level measurement sensor 121 may be disposed in the auxiliary steam generator 120 so as to measure a level of water stored in the steam generator 70. A detailed description of the auxiliary steam generator 120 will be provided later.

The cooking appliance 1 may further include a water channel 100.

The water channel 100 may connect the water supplying device 90 and the steam generator 70.

The water channel 100 may include a water supplying flow path 101 and a drainage flow path 102. Water supplied to the accommodation portion 94 of the storing unit 91 may move to the steam generator 70 along the water supplying flow path 101. In detail, water supplied to the accommodation portion 94 of the storing unit 91 is transferred to the water supplying pump 97a via the connection pipe 96, and the water that passes through the water supplying pump 97a moves to the steam generator 70 via the water supplying pipe 98. Water that remains in the steam generator 70 moves to the accommodation portion 94 of the storing unit 91 along the drainage flow path 102. In detail, water that remains in the steam generator 70 is transferred to the drainage pump 97b via the water supplying pipe 98, and the water that passes through the drainage pump 97b moves to the accommodation portion 94 of the storing unit 91 via the connection pipe 96.

The water supplying flow path 101 and the drainage flow path 102 may cross each other and may form at least one crossing point 103. The at least one crossing point 103 may be formed in a position where each of the connection pipe 96 and the water supplying pipe 98 branches.

The water supplying pump 97a may be disposed on the water supplying flow path 101. The drainage pump 97b may be disposed on the drainage flow path 102.

The connection pipe 96 and the water supplying pipe 98 may be disposed on the water channel 100.

The cooking appliance 1 may further include a steam supplying pipe 110 that connects the steam generator 70 and the cooking compartment 17 so that steam discharged from the steam generator 70 may be supplied to the cooking compartment 17. Steam discharged from the steam generator 70 may be heated while the steam is moved along the steam supplying pipe 110 and may be changed into superheated steam. The steam supplying pipe 110 may pass through one wall of the main body 10 and may connect the steam generator 70 and the cooking compartment 17. In detail, the steam supplying pipe 110 may pass through the rear frame 15 of the main body 10 and may connect the steam generator 70 and the cooking compartment 17. A detailed description of the steam supplying pipe 110 will be provided later.

In accordance with another aspect, the cooking appliance 1 may further include a steam supplying flow path (not shown) that connects the steam generator 70 and the cooking compartment 17 so that steam generated by the steam generator 70 may be moved to the cooking compartment 17. The steam supplying pipe 110 may be disposed on the steam supplying flow path (not shown) so as to connect the steam generator 70 and the cooking compartment 17. The convection heater 50 may be disposed on the steam supplying flow path (not shown) so as to form superheated steam by heating steam generated by the steam generator 70. The convection fan 60 may be disposed on the steam supplying flow path (not shown) so that superheated steam discharged through the steam discharge port 111 (see FIG. 4) may be uniformly sprayed into the cooking compartment 17. A part of the steam supplying flow path (not shown) may be disposed along an outer circumference of the convection heater 50.

Figure 4:
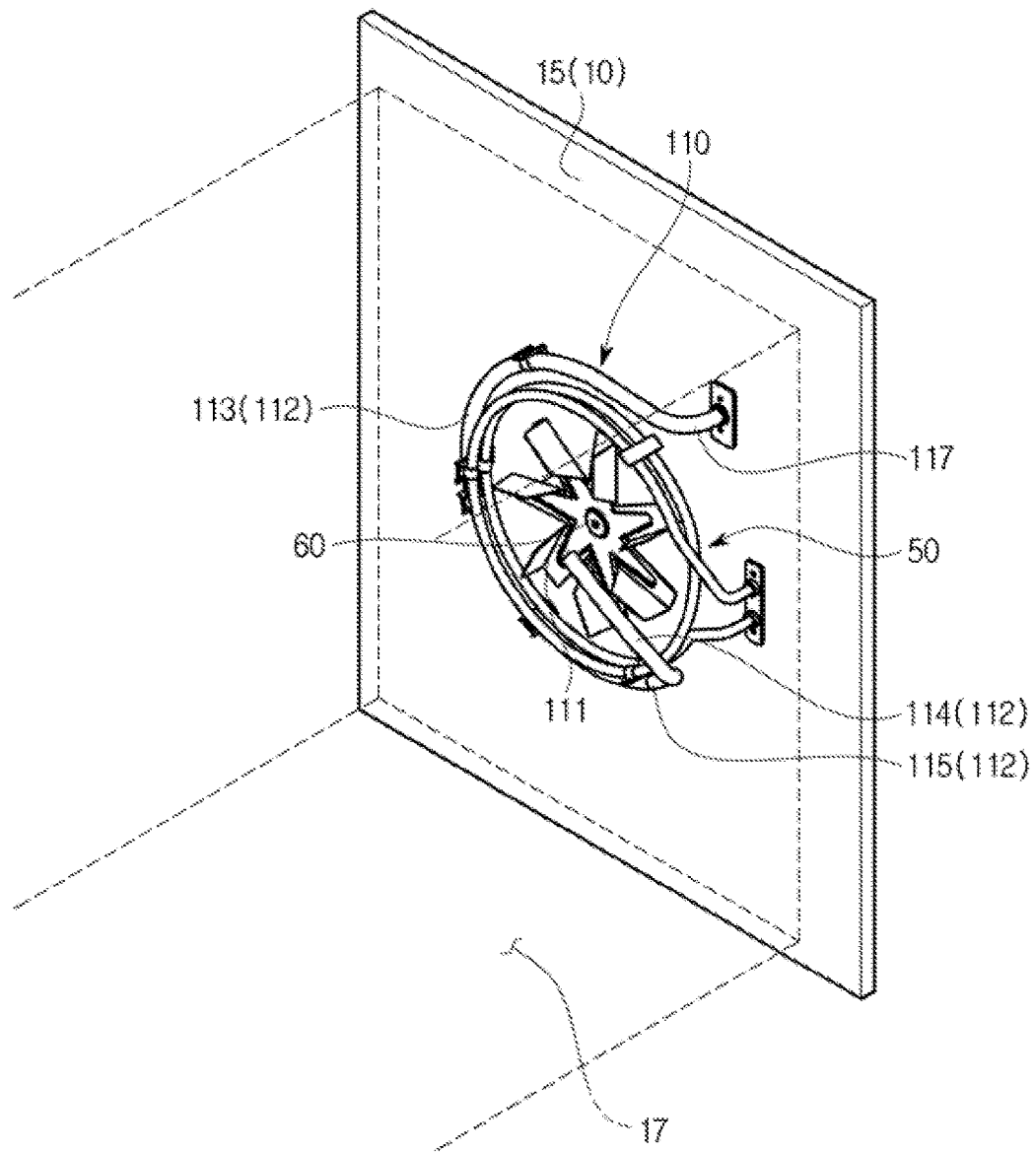
FIG. 4 is a view of an arrangement structure of a steam supplying pipe and a convection heater of the cooking appliance according to an embodiment of the present invention.
Figure 5:
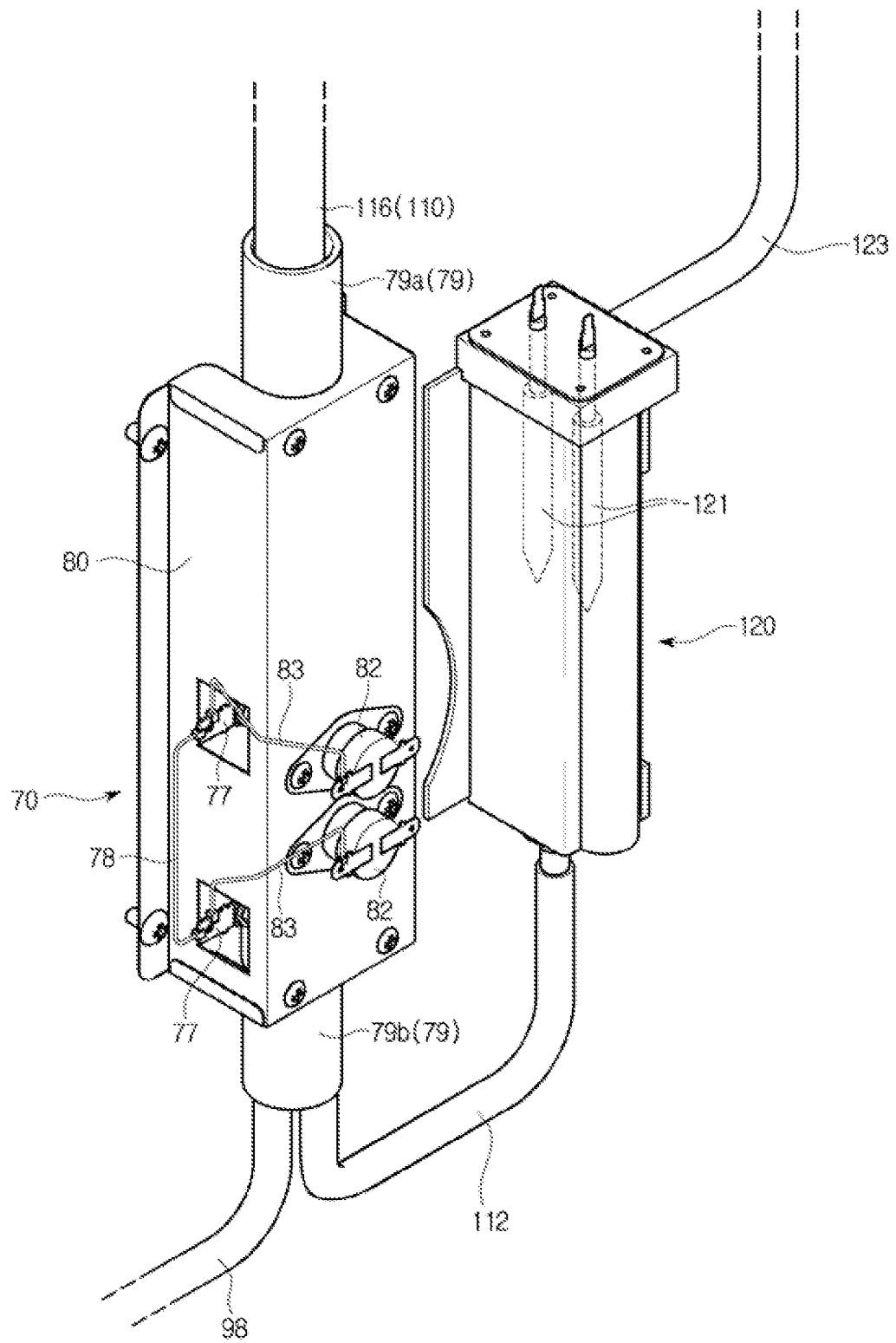
FIG. 5 is a perspective view of a steam generator and an auxiliary steam generator of the cooking appliance according to an embodiment of the present invention.
Figure 6:
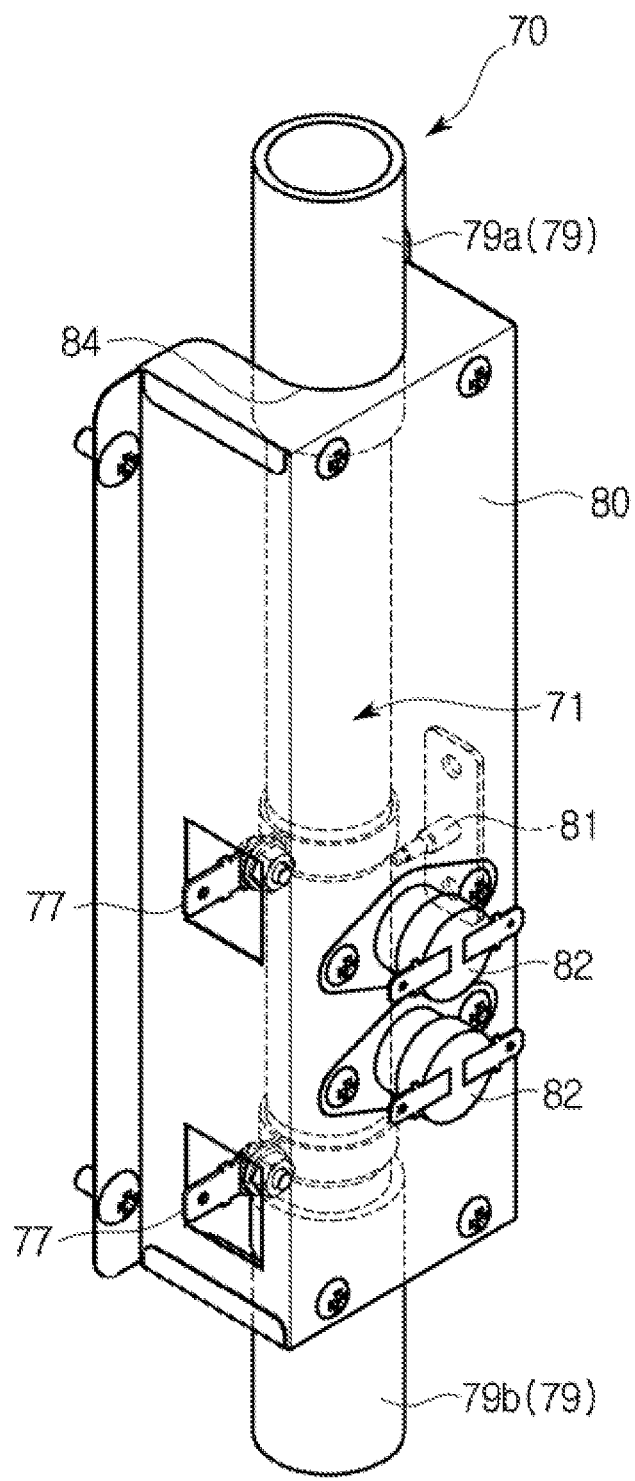
FIG. 6 is a perspective view of the steam generator of the cooking appliance according to an embodiment of the present invention.
Figure 7:
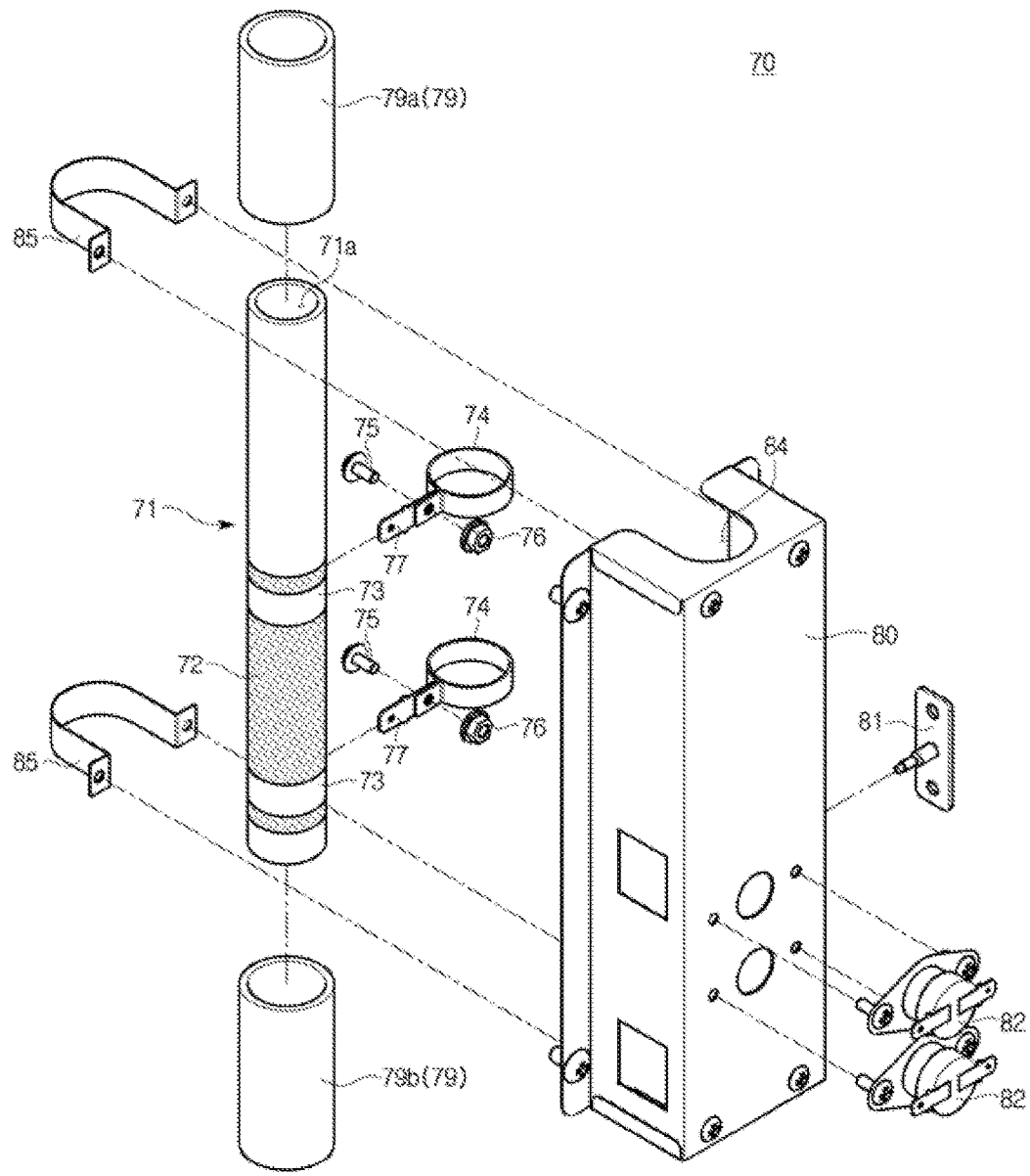
FIG. 7 is an exploded perspective view of the steam generator of the cooking appliance according to an embodiment of the present invention.

FIG. 4 is a view of an arrangement structure of a steam supplying pipe and a convection heater of the cooking appliance according to an embodiment of the present invention, and FIG. 5 is a perspective view of a steam generator and an auxiliary steam generator of the cooking appliance according to an embodiment of the present invention. FIG. 6 is a perspective view of the steam generator of the cooking appliance according to an embodiment of the present invention, and FIG. 7 is an exploded perspective view of the steam generator of the cooking appliance according to an embodiment of the present invention. Hereinafter, for unillustrated reference numerals, FIGS. 1 through 3 will be referred to.

As illustrated in FIGS. 4 through 7, the steam supplying pipe 110 may connect the steam generator 70 and the cooking compartment 17.

The steam supplying pipe 110 may include a first section 112.

The first section 112 may be disposed inside the main body 10. In other words, the first section 112 may be disposed in the cooking compartment 17.

The first section 112 may be disposed adjacent to the convection heater 50. The first section 112 may be disposed along a circumference of the convection heater 50. In detail, the first section 112 may be disposed along an outer circumference or an inner circumference of the convection heater 50.

At least a part of the first section 112 may be fixed to an inner wall of the main body 10. In detail, at least a part of the first section 112 may be fixed to an inside of the rear frame 15.

The first section 112 may include a fixed portion 113 and a separation portion 114. The fixed portion 113 may be fixed to an inner wall of the main body 10, i.e., the inside of the rear frame 15. The separation portion 114 may be separated from the inner wall of the main body 10, i.e., the inside of the rear frame 15. The separation portion 114 may be separated from the inner wall of the main body 10, i.e., from the inside of the rear frame 15 forward.

The first section 112 may further include a bending portion 115 that connects the fixed portion 113 and the separation portion 114.

The steam discharge port 111 through which superheated steam may be discharged, may be disposed in the first section 112. In detail, the steam discharge port 111 through which superheated steam may be sprayed into the cooking compartment 17 may be disposed in the separation portion 114.

The steam discharge port 111 may be opened toward an upper portion of the cooking compartment 17 so that superheated steam may be discharged toward the upper portion of the cooking compartment 17. That is, the steam discharge port 111 may be opened toward the top frame 11 so that superheated steam may be discharged toward the top frame 11 of the main body 10. When the steam discharge port 111 is opened toward a lower portion of the cooking compartment 17, superheated steam discharged from the steam discharge port 111 is, because of gravity, concentrated on the lower portion of the cooking compartment 17. Thus, superheated steam is not easily dispersed into the cooking compartment 17.

The steam discharge port 111 may be disposed in an upper position of the cooking compartment 17 than the bending portion 115.

The steam discharge port 111 may be separated from the inner wall of the main body 10. In one example, the steam discharge port 111 may be separated from the inner wall of the rear frame 15 of the main body 10.

When the steam discharge port 111 is in contact with the inner wall of the main body 10, superheated steam discharged from the steam discharge port 111 may not be transferred to food disposed in the cooking compartment 17 but may be condensed to be formed at the inner wall of the main body 10. That is, when the steam discharge port 111 is in contact with the inner wall of the main body 10, efficiency of transferring superheated steam to the food disposed in the cooking compartment 17 may be lowered.

The steam discharge port 111 may be disposed in the steam supplying pipe 110 to be oriented toward the convection fan. The steam discharge port 111 may be disposed in the steam supplying pipe 110 to be adjacent to the convection fan 60. Preferably, the steam discharge port 111 may be disposed in front of the convection fan 60. When the steam discharge port 111 is disposed adjacent to the convection fan 60, superheated steam discharged from the steam discharge port 111 may be uniformly sprayed into the cooking compartment 17 according to rotation of the convection fan 60.

The steam supplying pipe 110 may further include a second section 116.

The second section 116 may be connected to the steam generator 70. The second section 116 may be disposed to face an outer wall of the main body 10. That is, the second section 116 may be disposed outside the cooking compartment 17. The second section 116 may connect the steam generator 70 and the first section 112.

The steam supplying pipe 110 may further include a connection section 117.

The connection section 117 may pass through one wall of the main body 10 so as to connect the fixed portion 113 of the first section 112 and the second section 116. That is, the connection section 117 may pass through the rear frame 15 of the main body 10 so as to connect the fixed portion 113 of the first section 112 and the second section 116.

The connection section 117 may be disposed above the steam discharge port 111.

However, the present invention is not limited thereto.

In accordance with another aspect, the first section 112 may be formed at a downstream side of the steam supplying pipe 110 in a direction X in which steam discharged from the steam generator 70 is moved. The second section 116 may be formed at an upstream side of the steam supplying pipe 110 in the direction X in which steam discharged from the steam generator 70 is moved. The connection section 117 may be formed between the first section 112 and the second section 116. That is, the connection section 117 may be formed at a middle stream side of the steam supplying pipe 110 in the direction X in which steam discharged from the steam generator 70 is moved.

The fixed portion 113 may be formed at the upstream side of the first section 112 in the direction X in which steam discharged from the steam generator 70 is moved. The separation portion 114 may be formed at the downstream side of the first section 112 in the direction X in which steam discharged from the steam generator 70 is moved. The bending portion 115 may be formed between the fixed portion 113 and the separation portion 114. That is, the bending portion 115 may be formed at the middle stream side of the first section 112 in the direction X in which steam discharged from the steam generator 70 is moved.

The steam discharge port 111 may be formed at a lowest stream side of the steam supplying pipe 110 in the direction X in which steam discharged from the steam generator 70 is moved. However, the position of the steam discharge port 111 is not limited thereto.

The steam generator 70 and the auxiliary steam generator 120 may be disposed outside the cooking compartment 17. In other words, the steam generator 70 and the auxiliary steam generator 120 may be disposed between the rear frame 15 of the main body 10 and the cover 30. However, positions of arrangement of the steam generator 70 and the auxiliary steam generator 120 may be modified in various ways.

The steam generator 70 may include a heating pipe 71.

The steam generator 70 may include at least one heating pipe 71.

One end of the heating pipe 71 may be connected to the water supplying pipe 98, and the other end of the heating pipe 71 may be connected to the steam supplying pipe 110.

A hollow portion 71a may be disposed in the heating pipe 71 so that water supplied to the steam generator 70 via the water supplying pipe 98 may be moved through the hollow portion 71a.

The heating pipe 71 may include a heating layer 72. The heating layer 72 may be formed on at least a part of a surface of the heating pipe 71. The heating layer 72 having a coated shape may be disposed on at least a part of the surface of the heating pipe 71. The heating layer 72 may have a thin layer shape. Preferably, the heating layer 72 may have a thickness that is equal to or less than 100 nm. However, the present invention is not limited thereto. In addition, the heating layer 72 may have a material having a high power density. Preferably, the heating layer 72 may include a metal oxide. However, the present invention is not limited thereto. In this way, the heating layer 72 having the thin layer shape and the high power density may generate heat that reaches a high temperature instantaneously. Thus, the heating layer 72 may change water that moves along the hollow portion 71a in the heating pipe 71 into steam.

The heating pipe 71 may be disposed in the rear frame 15. The heating pipe 71 may be disposed in the rear frame 15 in a vertical direction. That is, the heating pipe 71 may be disposed in the rear frame 15 in a vertical direction of the cooking compartment 17.

Alternatively, the heating pipe 71 may be disposed in the rear frame 15 in a horizontal direction. That is, the heating pipe 71 may be disposed in the rear frame 15 in a direction of both sides of the cooking compartment 17.

Alternatively, the heating pipe 71 may be disposed in the rear frame 15 in a slanted direction. In detail, the heating pipe 71 may be disposed in the rear frame 15 so as to form a slope with respect to the vertical direction of the cooking compartment 17. Alternatively, the heating pipe 71 may be disposed in the rear frame 15 to form a slope with respect to the direction of both sides of the cooking compartment 17.

The heating layer 72 may be disposed on the surface of the heating pipe 71 corresponding to a portion that contacts the hollow portion 71a while water supplied to the steam generator 70 via the water supplying pipe 98 is moved along the hollow portion 71a. This is to prevent unnecessary overheating of the heating pipe 71. In one example, when the heating pipe 71 is disposed in the rear frame 15 in the direction of both sides of the cooking compartment 17, water supplied via the water supplying pipe 98 remains only in a bottom end of the hollow portion 71a, and a top end of the hollow portion 71a that does not contact water supplied via the water supplying pipe 98 is at risk of being overheated. In order to prevent such a phenomenon, the heating layer 72 may be formed only on the surface of the heating pipe 71 corresponding to the bottom end of the hollow portion 71a that water supplied via the water supplying pipe 98 contacts.

The steam generator 70 may further include a plurality of electrodes 73.

The plurality of electrodes 73 may be disposed on the surface of the heating pipe 71. The plurality of electrodes 73 may be disposed on the surface of the heating pipe 71 so as to be separated from each other. In detail, the plurality of electrodes 73 may be disposed on the heating layer 72 so as to be spaced a predetermined distance from each other. The plurality of electrodes 73 may be treated with a silver paste so as to apply power (not shown). The plurality of electrodes 73 are connected to power (not shown) so that a current may flow through the heating layer 72 and thus a temperature of the heating layer 72 rises.

The steam generator 70 may further include a plurality of connectors 74.

A plurality of connectors 74 may be disposed on the plurality of electrodes 73. The plurality of connectors 74 may be inserted into and coupled to the heating pipe 71 so as to correspond to a position where the plurality of electrodes 73 are disposed. The plurality of connectors 74 may be fixed onto the plurality of electrodes 73 by coupling a bolt 75 and a nut 76. A coupling terminal 77 may be disposed in the plurality of connectors 74. The coupling terminal 77 disposed in the plurality of connectors 74 may be connected to a wire 78 (see FIG. 5) so that a current may flow through the plurality of connectors 74 through the wire 78. The plurality of connectors 74 and the coupling terminal 77 may be formed of a material through which a current may flow.

The steam generator 70 may further include a connection member 79.

The connection member 79 may include a first connection member 79a that connects the water supplying pipe 98 and the heating pipe 71, and a second connection member 79b that connects the steam supplying pipe 110 and the heating pipe 71. The connection member 79 strengthens coupling of the water supplying pipe 98 and the heating pipe 71 and coupling of the steam supplying pipe 110 and the heating pipe 71, thereby preventing leakage of water.

The steam generator 70 may further include a case 80.

The heating pipe 71 may be disposed inside the case 80. The heating pipe 71 may be disposed between the rear frame 15 and the case 80. The heating pipe 71 may be fixed to a heating pipe seating portion 84 formed in the case 80 by a fastening member 85. The case 80 may be fixed to the rear frame 15 in a state in which the heating pipe 71 is fixed to the heating pipe seating portion 84 of the case 80.

The steam generator 70 may further include a temperature measurement sensor 81 that measures temperature of the heating pipe 71. The temperature measurement sensor 81 may be disposed at one side of the case 80 so as to measure temperature of the heating layer 72. However, the position of the temperature measurement sensor 81 may be modified in various ways and is not limited to one side of the case 80.

The steam generator 70 may further include an overheating prevention sensor 82. A plurality of overheating prevention sensors 82 may be installed. The overheating prevention sensor 82 physically blocks the flow of a current and prevents the heating layer 72 from being overheated at a predetermined temperature or higher. One among the plurality of overheating prevention sensors 82 is connected to the coupling terminal 77 of one among the plurality of connectors 74, and another one among the plurality of overheating prevention sensors 82 is connected to the coupling terminal 77 of another one among the plurality of connectors 74. The coupling terminals 77 of the plurality of overheating prevention sensors 82 and the plurality of connectors 74 may be connected to each other using a wire 83. The overheating prevention sensor 82 may be installed on the case 80. However, an installation position of the overheating prevention sensor 82 may be modified in various ways and is not limited to "on" the case 80.

The auxiliary steam generator 120 may be disposed at one side of the steam generator 70. The auxiliary steam generator 120 may be connected to the steam generator 70 via a flow path pipe 122, and the water level measurement sensor 121 for measuring a level of water stored in the steam generator 70 may be coupled to the auxiliary steam generator 120. The reason why the auxiliary steam generator 120 is separately disposed to measure the level of water stored in the steam generator 70 is that, when the steam generator 70 is coupled to the water level measurement sensor 121 and operates, a higher measurement value than an actual water level may be generated due to the steam's pressure generated in the steam generator 70.

Since water is simultaneously introduced into the heating pipe 71 and the auxiliary steam generator 120 via the flow path pipe 122, and an inside of the auxiliary steam generator 120 is in communication with the outside via a communication pipe 123, the level of water stored in the steam generator 70 (measured as a height from a bottom surface on which the cooking appliance 1 is installed to the surface of the water stored in the steam generator 70) and the level of water stored in the auxiliary steam generator 120 (measured as a height from the bottom surface on which the cooking appliance 1 is installed to the surface of the water stored in the auxiliary steam generator 120) are substantially equally maintained. Thus, measuring the level of water stored in the auxiliary steam generator 120 allows the level of water stored in the steam generator 70 to also be known.

Superheated steam refers to steam for which the temperature becomes higher than the saturation temperature by heating the saturation steam under static pressure. In other words, superheated steam refers to steam generated by heating saturated steam generated by an atmospheric pressure and using a temperature a higher than 100° C. Superheated steam may be supplied to the food while the food is cooked. In one example, superheated steam may be supplied to bread while the bread is baked. An operation of baking bread may include at least one of a fermentation operation and a heating operation. When superheated steam is added while bread is baked, the surface of bread may be prevented from being hardened. As a result, sufficient oven spring, a phenomenon where the volume of bread dough is increased when the dough of fermented bread is baked, may be expected, and the flavor of the bread may be improved. In another example, superheated steam may be supplied to meat while the meat is cooked. When superheated steam is added while meat is cooked, condensation heat of the superheated steam is transferred to the meat, and the surface of the meat may be yellowish or crispy, while the inside of meat may be moist. Since superheated steam may have more condensation heat than steam (saturated steam), superheated steam may transfer more condensation heat to food.

The user may freely adjust a time of spraying superheated steam. The user may freely adjust the time of spraying superheated steam periodically or temporarily.

Figure 8A:
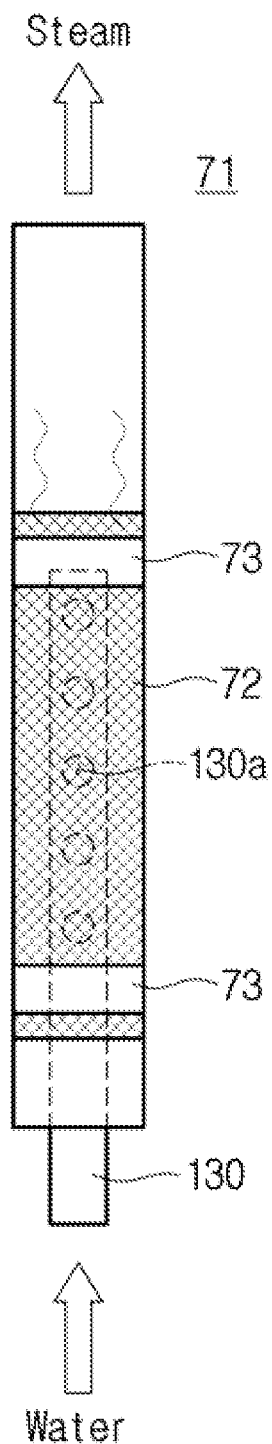
FIGS. 8A through 8C are views schematically illustrating various steam generators that can be applied to the cooking appliance according to an embodiment of the present invention.
Figure 8B:
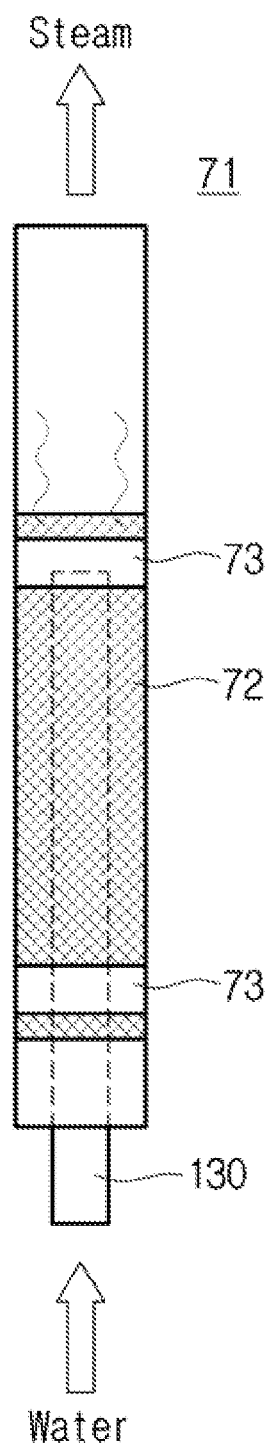
Figure 8C:
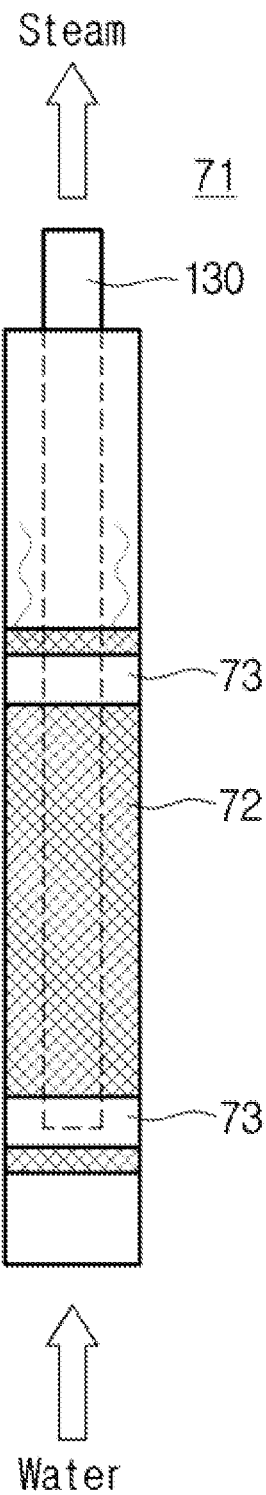

FIGS. 8A through 8C are views schematically illustrating various steam generators that can be applied to the cooking appliance according to an embodiment of the present invention. Hereinafter, for unillustrated reference numerals, FIGS. 1 through 7 will be referred to.

As illustrated in FIGS. 8A through 8C, a pipe 130 may be inserted into the heating pipe 71. The pipe 130 may include at least one material among polyphenylene sulfide (PPS) and steel use stainless (SUS). The amount of water that is instantaneously heated by the heating layer 72 by inserting the pipe 130 into the heating pipe 71 may be reduced. That is, when the pipe 130 is inserted into the heating pipe 71, due to the volume of the pipe 130, the volume of water that may be heated by the heating layer 72 is reduced. Thus, a steam generation module having a higher response speed may be manufactured.

As illustrated in FIG. 8A, a plurality of holes 130a may be formed in a surface of the pipe 130.

Alternatively, as illustrated in FIGS. 8B and 8C, the surface of the pipe 130 may be smooth. The pipe 130 may not have a hollow portion.

The pipe 130 may be inserted into one side of the heating pipe 71 to which the water supplying pipe 98 is connected, as illustrated in FIGS. 8A and 8B. Alternatively, the pipe 130 may be inserted into the other side of the heating pipe 71 to which the steam supplying pipe 110 is connected, as illustrated in FIG. 8C. In other words, the pipe 130 may be inserted into one side of the heating pipe 71 to which water is supplied (see FIGS. 8A and 8B) or into the other side of the heating pipe 71 from which steam is discharged (see FIG. 8C).

A method of generating steam by heating water supplied via the water supplying pipe 98 by using the steam generator 70 is not limited to the above example. A method of heating water supplied via the water supplying pipe 98 may include a direct heating method and an indirect heating method. In the direct heating method, a heating container is filled with a predetermined amount of water, and water filled in the heating container is directly heated using an internal heater soaked in the water. In the indirect heating method, the heating container is heated using a heater installed outside the heating container, and a predetermined amount of water is sprayed into the heated heating container and is heated.

Figure 9:
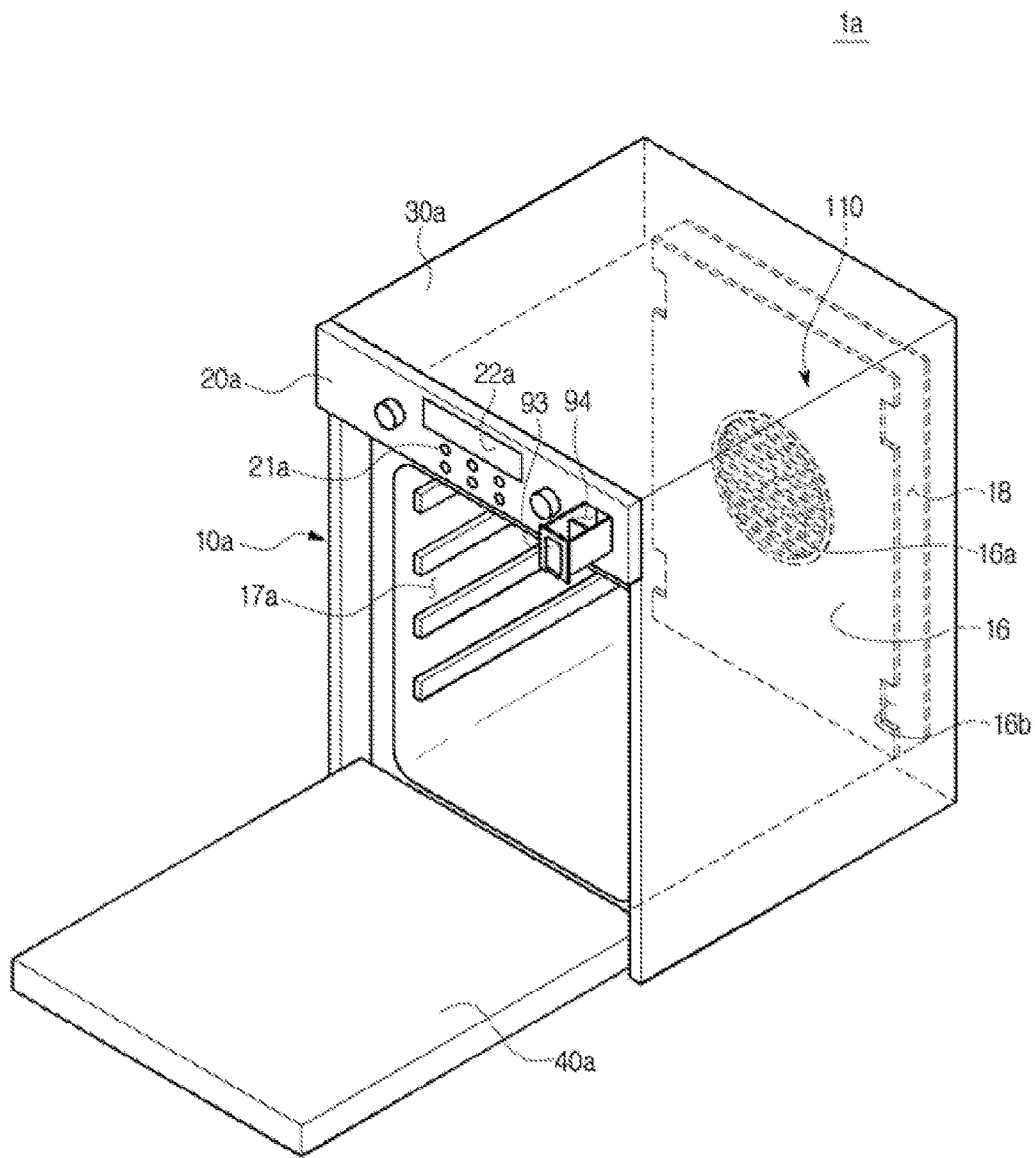
FIG. 9 is a perspective view of a cooking appliance according to another embodiment of the present invention.
Figure 10:
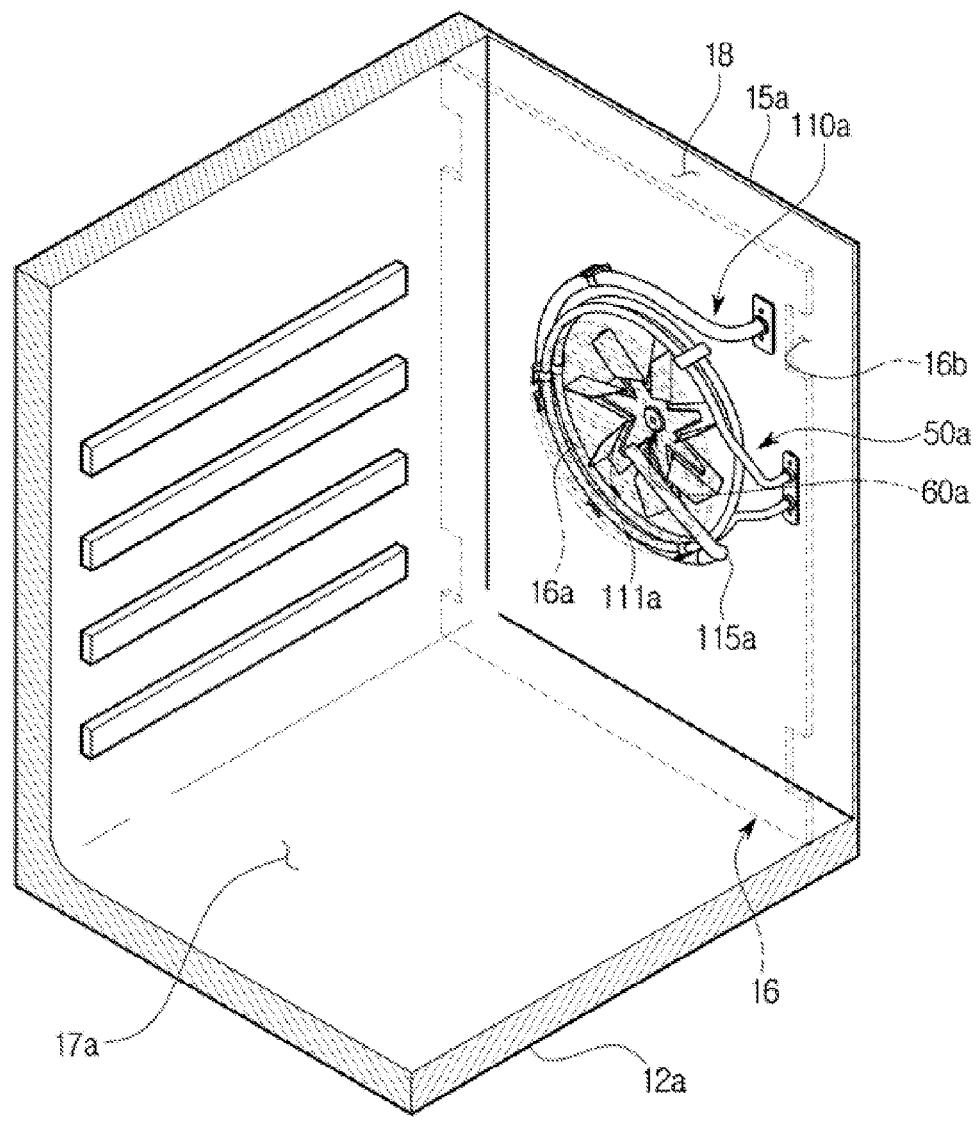
FIG. 10 is a perspective view of an inside of a main body of the cooking appliance according to another embodiment of the present invention.

FIG. 9 is a perspective view of a cooking appliance according to another embodiment of the present invention, and FIG. 10 is a perspective view of an inside of a main body of the cooking appliance according to another embodiment of the present invention.

Hereinafter, for unillustrated reference numerals, FIGS. 1 through 7 will be referred to. In addition, a redundant description of FIGS. 1 through 8C may be omitted.

As illustrated in FIGS. 9 and 10, a cooking appliance 1a may include a main body 10a and a cover 30a.

The main body 10a may be coupled to the cover 30a and may form an exterior of the cooking appliance 1a. A cooking compartment 17a and a heating chamber 18 may be disposed in the main body 10a. In detail, the cooking compartment 17a may be disposed in front of the main body 10a, and the heating chamber 18 may be disposed behind the main body 10a. The cooking compartment 17a and the heating chamber 18 may be disposed in the main body 10a to be in communication with each other.

The cooking compartment 17a and the heating chamber 18 may be partitioned by a partitioning panel 16 having a plurality of openings 16a and 16b. In other words, the partitioning panel 16 having the plurality of openings 16a and 16b may partition the main body 10a into the cooking compartment 17a and the heating chamber 18. Thus, the heating chamber 18 may be formed by coupling the partitioning panel 16, a rear frame 15a, a right side frame 13, a left side frame (not shown), a top frame 11, and a bottom frame 12a. The plurality of openings 16a and 16b may include an inhalation port 16a and a discharge port 16b. The inhalation port 16a may be formed at an inside of the partitioning panel 16. The discharge port 16b may be formed at edges of the partitioning panel 16, and a plurality of discharge ports 16b may be formed. However, the number of the plurality of openings 16a and 16b and a position thereof are not limited to the above example and may be modified in various ways.

The cover 30a may be disposed to cover the main body 10a.

The cooking compartment 17a in which food is cooked, may be opened/closed by a door 40a coupled to the front of the main body 10a. The door 40a may be rotatably coupled to the front of the main body 10a.

A control panel 20a on which various operation switches 21a are disposed, may be disposed on a front surface of the main body 10a so that the user may control an operation of the cooking appliance 1a through the control panel 20a. In addition, a display unit 22a that displays an operating state of the cooking appliance 1a may be disposed on the control panel 20a.

The cooking appliance 1a may further include a convection heater 50a. The convection heater 50a may be disposed in the heating chamber 18 so as to heat the cooking compartment 17a. In detail, the convection heater 50a may be fixed to an inner wall of the main body 10a, i.e., an inner wall of the rear frame 15a so as to face the heating chamber 18. At least one of heat generated in the convection heater 50a and superheated steam heated by the convection heater 50a may be circulated in the heating chamber 18 and the cooking compartment 17a through the plurality of openings 16a and 16b.

The cooking appliance 1a may further include a convection fan 60a. The convection fan 60a may be rotatably disposed in the heating chamber 18 so that at least one of heat generated in the convection heater 50a and superheated steam discharged through a steam discharge port 111a may be circulated in the heating chamber 18 and the cooking compartment 17a. In detail, the convection fan 60a may be fixed to the inner wall of the main body 10a, i.e., the inner wall of the rear frame 15a so as to face the heating chamber 18.

The cooking appliance 1a may further include a steam generator 70. The steam generator 70 may be disposed to generate steam by primarily heating water supplied via a water supplying pipe 98.

The cooking appliance 1a may further include a steam supplying pipe 110a that connects the steam generator 70 and the heating chamber 18 so that steam discharged from the steam generator 70 may be supplied to the heating chamber 18. Steam discharged from the steam generator 70 may be secondarily heated while steam is moved along the steam supplying pipe 110a and may be changed into superheated steam. The steam supplying pipe 110a may pass through the rear frame 15a of the main body 10a and may connect the steam generator 70 and the heating chamber 18.

The steam discharge port 111a may be opened toward an upper portion of the heating chamber 18 so that superheated steam may be discharged toward the upper portion of the heating chamber 18.

The steam discharge port 111a may be disposed in an upper position of the heating chamber 18 than a bending portion 115a.

While the convection fan 60a rotates, air inside the cooking compartment 17a is introduced into the heating chamber 18 through the inhalation port 16a formed in the partitioning panel 16. The air introduced into the heating chamber 18 through the inhalation port 16a is heated by the convection heater 50a and is moved into the cooking compartment 17a through the discharge port 16b formed in the partitioning panel 16. Superheated steam discharged from the steam discharge port 111a is discharged from the heating chamber 18 into the cooking compartment 17a through the discharge port 16b together with air heated by the convection heater 50a.

As described above, a cooking appliance that supplies superheated steam while food is cooked is used so that destruction or a loss of nutrients included in food can be prevented.

When superheated steam is supplied while food is cooked, condensation heat is generated when superheated steam is condensed and is transferred to the food so that a heating effect of food can be further improved.

A convection heater disposed in the cooking appliance is used while superheated steam is formed, instead of a separate heater, so that the amount of energy usage of the cooking appliance can be reduced.

When superheated steam is formed using the convection heater disposed in the cooking appliance, the separate heater is not necessary so that the structure of the cooking appliance can be simplified.

When superheated steam is sprayed into a convection fan disposed in the cooking appliance, superheated steam can be uniformly sprayed into a cooking compartment according to an operation of the convection fan.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A cooking appliance that supplies superheated steam while food is cooked, the cooking appliance comprising:
   a main body, a front of which is opened and in which a cooking compartment is disposed;
   a heating chamber disposed in the main body to be in communication with the cooking compartment;
   a steam generator disposed to generate steam from water;
   a steam discharge port directed upwardly toward an upper portion of the cooking compartment; and
   a convection heater disposed in the heating chamber to heat the heating chamber and the cooking compartment and that heats the steam generated discharged to generate a superheated steam to be sprayed into the cooking compartment via the steam discharge port upwardly toward the upper portion of the cooking compartment.

2. The cooking appliance of claim 1, further comprising: a steam supplying pipe that connects the steam generator and the heating chamber so that the steam generated by the steam generator is supplied to the heating chamber, wherein the steam generated by the steam generator is heated while the steam is moved along the steam supplying pipe and is changed into the superheated steam.

3. The cooking appliance of claim 2, wherein the steam generator and the convection heater are disposed to face each other in a state in which one wall of the main body is disposed between the steam generator and the convection heater, and the steam supplying pipe passes through one wall of the main body and connects the steam generator and the heating chamber.

4. The cooking appliance of claim 2, wherein the convection heater is fixed to one inner wall of the main body that forms the heating chamber, and the steam supplying pipe includes a first section, which is adjacent to the convection heater and at least a part of which is fixed to one inner wall of the main body.

5. The cooking appliance of claim 4, wherein the first section is disposed along a circumference of the convection heater.

6. The cooking appliance of claim 4, wherein the steam discharge port, through which the superheated steam is discharged, is disposed in the first section, and the steam discharge port is separated from one inner wall of the main body.

7. The cooking appliance of claim 6, further comprising: a convection fan that is rotatably disposed in the heating chamber so that at least one of heat generated in the convection heater and superheated steam discharged through the steam discharge port is circulated in the cooking compartment, wherein the steam discharge port is disposed in front of the convection fan.

8. The cooking appliance of claim 6, wherein the cooking compartment is disposed in a front portion of the main body and the heating chamber is disposed in a rear portion of the main body, and the steam discharge port is opened toward an upper portion of the heating chamber so that the superheated steam is discharged toward the upper portion of the heating chamber.

9. The cooking appliance of claim 4, wherein the first section comprises:
a fixed portion fixed to one inner wall of the main body;
a separation portion separated from one inner wall of the main body; and
wherein the steam discharge port through which the superheated steam is sprayed into the heating chamber is disposed in the separation portion.

10. The cooking appliance of claim 9, further comprising:
a discharge port, wherein the first section further comprises a bending portion that connects the fixed portion and the separation portion, and the discharge port is disposed above the heating chamber such that a position of the discharge port is higher than a position of the bending portion.

11. The cooking appliance of claim 4, wherein the steam supplying pipe further comprises a second section that is disposed to face one outer wall of the main body and connects the steam generator and the first section.

12. The cooking appliance of claim 9, wherein the steam supplying pipe comprises:
a second section that is connected to the steam generator and is disposed to face one outer wall of the main body; and
a connection section that passes through one wall of the main body to connect the fixed portion and the second section.

13. The cooking appliance of claim 12, wherein the connection section is disposed above the steam discharge port.

14. The cooking appliance of claim 1, wherein the cooking compartment and the heating chamber are partitioned by a partitioning panel having a plurality of openings, and at least one of the heat generated in the convection heater and the superheated steam heated by the convection heater is circulated in the heating chamber and the cooking compartment through the plurality of openings.

15. A cooking appliance that supplies superheated steam while food is cooked, the cooking appliance comprising:
a main body in which a cooking compartment is disposed;
a steam generator disposed to generate steam by heating supplied water;
a steam supplying flow path that connects the steam generator and the cooking compartment so that the steam generated by the steam generator is moved to the cooking compartment; and
a heater disposed on the steam supplying flow path to generate superheated steam by heating the steam generated by the steam generator, and
wherein the superheated steam in the steam supplying flow path is released into the cooking compartment via a discharge port disposed toward an upper portion of the cooking compartment.

16. The cooking appliance of claim 15, wherein the heater is disposed in an inner wall of the main body to face the cooking compartment.

17. The cooking appliance of claim 15, wherein the heater comprises a convection heater.

18. The cooking appliance of claim 15, further comprising a water supplying device disposed to supply water to the steam generator,
wherein the water supplying device comprises:
a storing unit disposed to be so that water is stored in the storing unit; and
at least one pump disposed between the storing unit and the steam generator so as to supply a driving force at which water moves between the storing unit and the steam generator.

19. The cooking appliance of claim 18, further comprising a water channel that connects the water supplying device and the steam generator,
wherein the water channel comprises:
a water supplying flow path on which water supplied to the storing unit moves toward the steam generator; and
a drainage flow path on which water that remains in the steam generator moves toward the storing unit.

20. The cooking appliance of claim 19, wherein the at least one pump comprises:
a water supplying pump disposed on the water supplying flow path; and
a drainage pump disposed on the drainage flow path.

21. The cooking appliance of claim 19, wherein the water supplying flow path and the drainage flow path cross each other and form at least one crossing point.

22. The cooking appliance of claim 15, wherein a part of the steam supplying flow path is disposed along an outer circumference of the heater.

23. A cooking appliance that supplies superheated steam while food is cooked, the cooking appliance comprising:
a main body, a front of which is opened and in which a cooking compartment is disposed;
a steam generator disposed to generate steam;
a steam discharge port directed upwardly toward an upper portion of the cooking compartment;
a convection heater disposed in the main body to heat the steam generated by the steam generator; and
a steam supplying pipe that is connected to the steam generator so that air discharged from the steam generator is moved, and that extends to an inside of the cooking compartment,
wherein the steam generated by the steam generator is heated by the convection heater while passing through the steam supplying pipe to generate a superheated steam state to be sprayed into the cooking compartment upwardly toward the upper portion of the cooking compartment.

24. The cooking appliance of claim 23, wherein the convection heater is installed on an inner wall of the main body, and the steam supplying pipe is installed on the inner wall of the main body along a circumference of the convection heater to be adjacent to the convection heater.

25. The cooking appliance of claim 24, wherein the steam discharge port, through which the superheated steam is discharged, is disposed in the steam supplying pipe, and the steam discharge port is separated from the inner wall of the main body.

26. The cooking appliance of claim 25, further comprising
a convection fan rotatably installed on the inner wall of the main body so that at least one of heat generated in the convection heater and superheated steam discharged through the steam discharge port is circulated in the cooking compartment,
wherein the steam discharge port is disposed in the steam supplying pipe to be oriented toward the convection fan.

* * * * *